United States Patent [19]

Carper

[11] 4,248,466
[45] Feb. 3, 1981

[54] SNOW SCOOP WITH WEAR STRIP ALONG LIP AND METHOD OF ATTACHING THE WEAR STRIP IN A BLOW MOLDING PROCESS

[76] Inventor: William B. Carper, c/o McCaleb, Lucas & Brugman 230 W. Monroe St., Ste.-2040, Chicago, Ill. 60606

[21] Appl. No.: 959,486

[22] Filed: Nov. 13, 1978

[51] Int. Cl.³ .............................................. E01H 5/02
[52] U.S. Cl. .......................................... 294/54; 37/53
[58] Field of Search ....................... 294/54, 53, 55, 56, 294/57, 58; 37/41, 53, 130, 134; 15/236 R; 156/242; 180/42.26

[56] References Cited

U.S. PATENT DOCUMENTS

| 3,028,692 | 4/1962 | Brock | 294/54 |
| 3,477,149 | 11/1969 | Wagner | 294/54 |
| 4,125,951 | 11/1978 | Hueyth | 294/54 |

Primary Examiner—James B. Marbert
Attorney, Agent, or Firm—McCaleb, Lucas & Brugman

[57] ABSTRACT

A blow molded plastic snow scoop with a wear strip automatically attached to the lip during the blow molding procedure. The wear strip has two elongated slots, at opposite ends, each extending closely adjacent the respective ends. During the blow molding procedure, ribs of plastic material are extruded from the underside of the leading edge portion, through the slots, and are flattened to provide flanges engaging bottom surfaces of the wear strip alongside the slots. During the blow molding procedure, the wear strip is held by positioning pins inserted through the inner ends of the slots. When the pins are withdrawn following the molding procedure, they provide clearance cavities between the inner ends of the ribs and the slots enabling the ribs to shift inwardly along the slots with the cavities receiving the ends of the slots, to compensate for shrinkage of the plastic relative to the wear strip during cooling.

8 Claims, 13 Drawing Figures

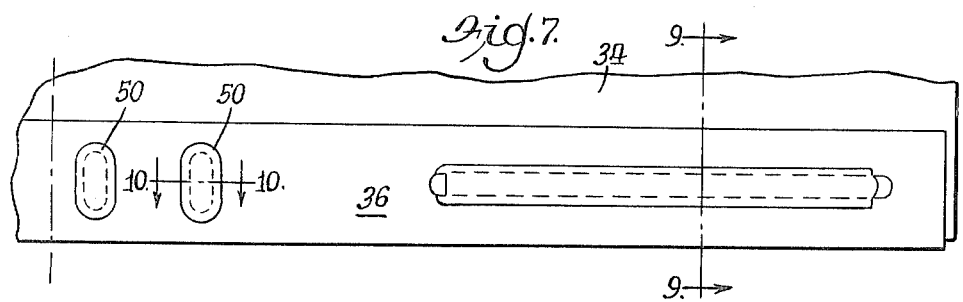
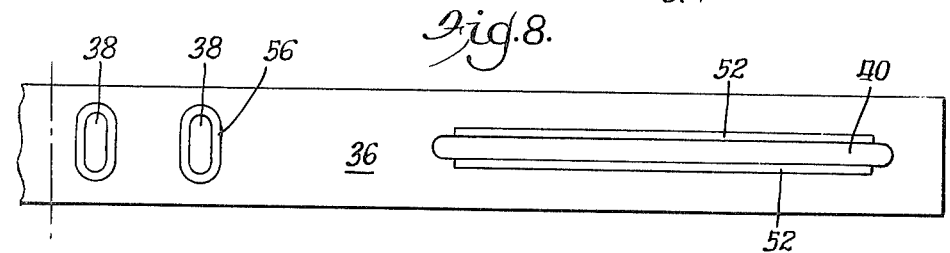
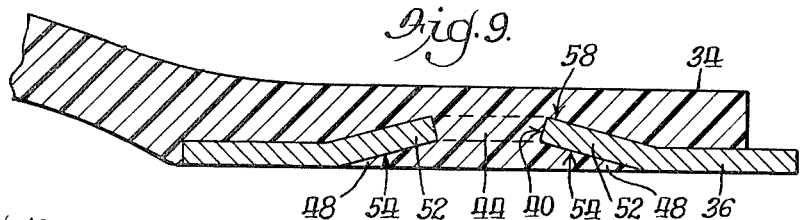
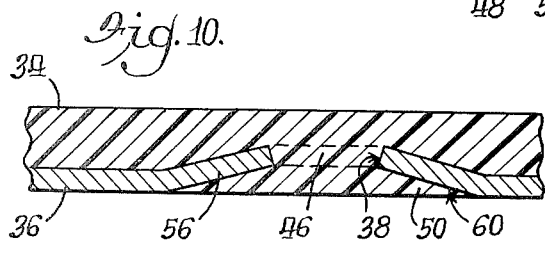
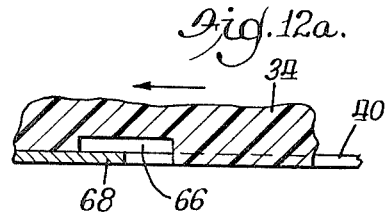
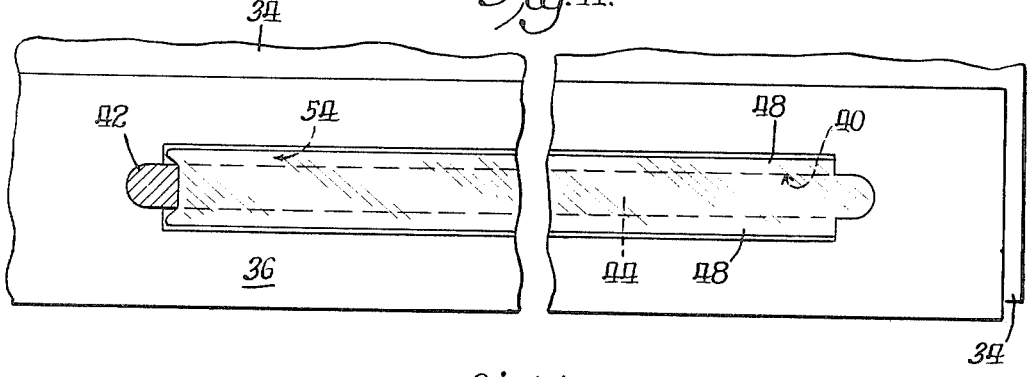
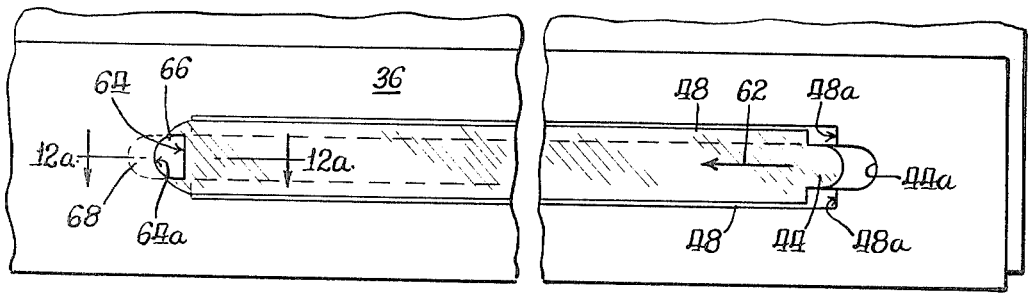

SNOW SCOOP WITH WEAR STRIP ALONG LIP AND METHOD OF ATTACHING THE WEAR STRIP IN A BLOW MOLDING PROCESS

BACKGROUND OF THE INVENTION

Reference is made to applicant's co-pending application Serial No. 952,574, filed Oct. 18, 1978 on SNOW SCOOP. This invention belongs to the field of snow removal devices such as snow scoops and shovels. These conventionally are made of aluminum with a steel wear strip attached, as by riveting in a separate manufacturing step, along the leading edge portion.

An ideal material for snow scoops and shovels is high density polyethylene or an equivalent plastic. It is light in weight and snow will not stick to it.

To minimize manufacturing costs, it would be preferable to attach a steel wear strip automatically during molding of the plastic.

A problem however arises from the mold shrinkage properties of plastics materials. For high density polyethylene, this is in the neighborhood of 0.02 inches per inch. This means, for a snow scoop 24 inches wide, with a steel wear strip extending along the leading edge portion, the plastic material will shrink almost half an inch in cooling down from the mold, while the steel wear strip for all practical purposes would not shrink at all. This differential shrinkage creates a very serious problem of attaching a non-shrinkable wear strip to a shrinkable plastic leading edge portion before the latter has cooled and the mold shrinkage runs its course. Some previous attempts to mold the plastic while hot directly to a steel wear strip have resulted in cracking of the plastic or distortion and bowing of the leading edge portion because of this vast difference in shrinkage.

SUMMARY OF THE INVENTION

It is a general object of the present invention to provide a snow scoop with a wear strip attached along the leading edge portion as part of the plastic molding procedure.

A specific object of the invention is to provide a wear strip with elongated slots extending along its length closely adjacent the left and right hand end portions thereof, and fastening the wear strip to the leading end portion of the plastic scoop housing during the molding procedure by extruding ribs of heated, molten plastic material from the leading end portion through the slots and forming along the tops of the ribs having slidable contact with the bottoms of the wear strips, enabling the ribs to slide lengthwise of the wear strip as the plastic leading edge portion cools and contracts following the molding operation.

Another object is to recess the edges of the slots on the bottom side of the wear strip to provide concavities for the flanges.

Another object is to provide the slots with substantial lengths, each exceeding a major portion of the length of the corresponding left or righthand half of the wear strip.

Another object is to provide fastening means for locking the center of the leading edge portion of the scoop housing to the center portion of the wear strip independently of the above mentioned elongated slots and ribs.

Another object is to provide fastening means for locking the center of the leading edge portion of the scoop housing to the center portion of the wear strip comprising a plurality of buttons of plastic material extruded while molten from that leading end portion through the openings in the wear strip, and selecting a plastic material in which the elongation at yield is substantially larger than the mold shrinkage to avoid latent stress overloading thereof.

Other objects and advantages will be apparent from the following description taken in connection with the accompanying drawings in which:

BRIEF DESCRIPTION OF THE DRAWINGS

FIG. 7 is a fragmentary enlarged view of FIG. 5;

FIG. 8 is a fragmentary view of one end of the wear strip shown in FIG. 7, without plastic material, to better show details of the slots and openings formed therein;

FIG. 9 is an enlarged cross-sectional view of FIG. 7 taken along lines 9—9;

FIG. 10 is a fragmentary enlarged cross-sectional view of FIG. 7 taken along lines 10—10;

FIG. 11 is a fragmentary bottom view of the snow scoop at the stage of the blow molding procedure immediately after the molten plastic has been extruded through the slots in the wear strip, and while the locating pins are still in place;

FIG. 12 is a view similar to FIG. 11 at a later stage when the plastic housing and wear strip assembly is removed from the mold and the plastic ribs have shrunk and shifted inwardly (to the left in FIG. 12) toward the inner ends of the slots; and FIG. 12a is a fragmentary cross-sectional view of FIG. 12 taken along lines 12a—12a and showing a cavity made by one of the locating pins shifted leftwise to receive the inner end of one of the slots in the wear strip.

Like parts are referred to by like reference characters.

DESCRIPTION OF THE PREFERRED EMBODIMENT

Figure 1:
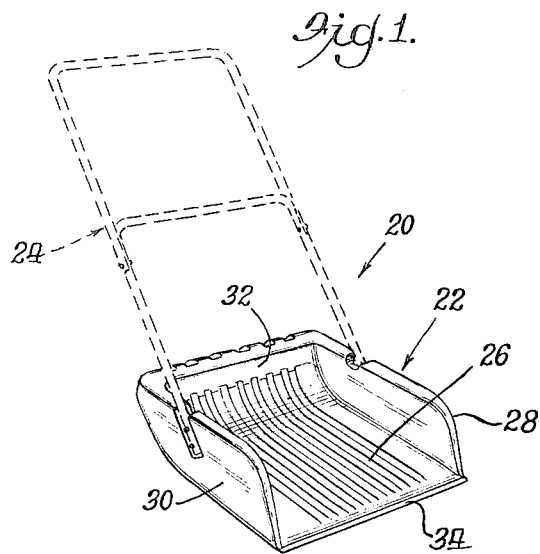
FIG. 1 is a perspective view of a snow scoop illustrating one form and method of practicing the present invention, with a removable and collapsible handle being shown in broken lines.
Figure 2:
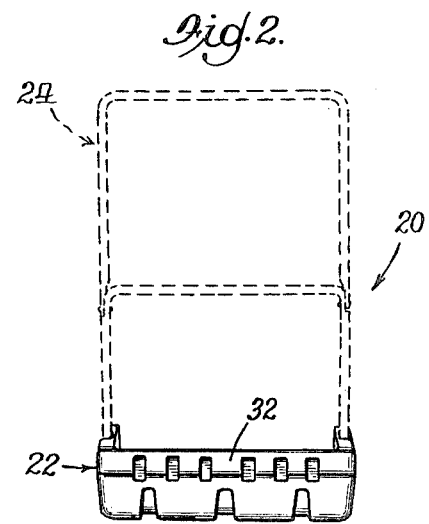
FIG. 2 is a rear view of FIG. 1.
Figure 3:
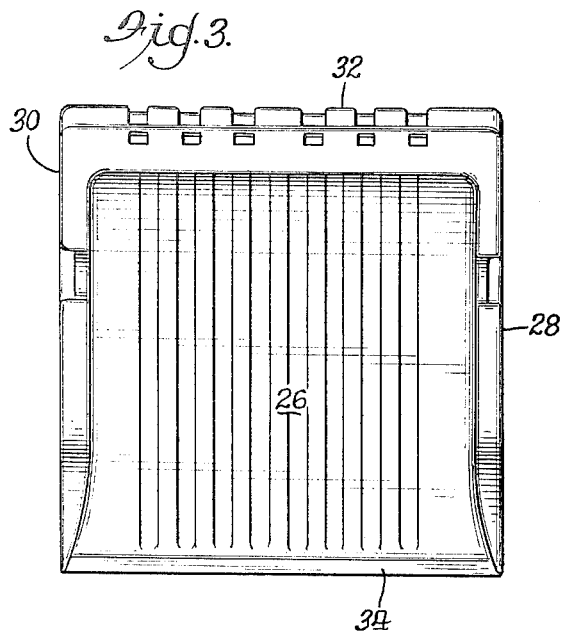
FIG. 3 is an enlarged top view of the snow scoop without the handle.
Figure 4:
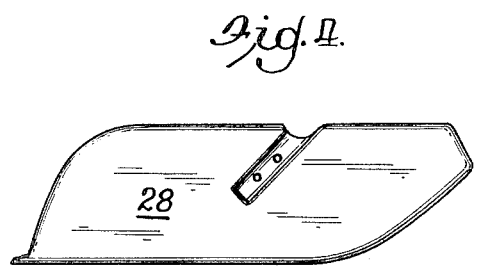
FIG. 4 is a side view of FIG. 3.
Figure 6:
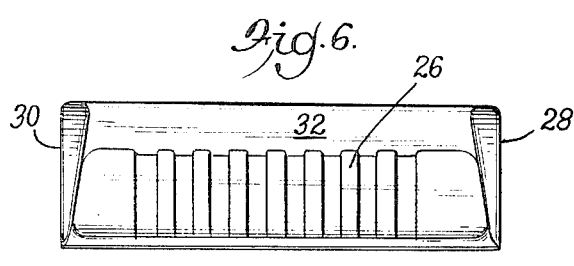
FIG. 6 is a front view of FIG. 3.
Figure 5:
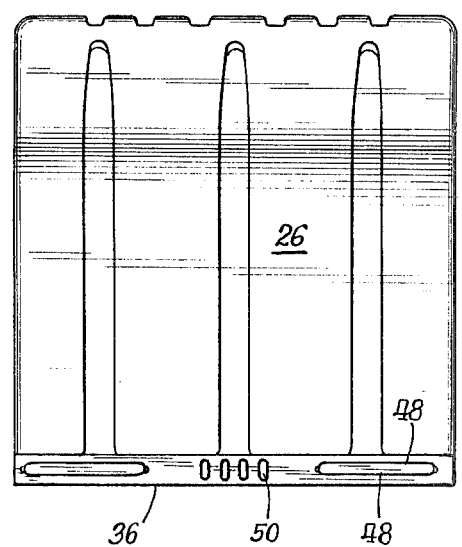
FIG. 5 is a bottom view of FIG. 3.

Referring now to the specific embodiment of the invention in the drawings, the snow scoop is generally designated 20. It has a molded plastic scoop housing 22 and a removable, collapsible handle 24, the latter being shown in broken lines. The housing has a bottom wall 26, left side wall 28, right side wall 30, back wall 32, and a lip or leading edge portion 34.

One plastic material which has been used successfully for the scoop housing is high density polyethylene. It has high impact strength when cold, and snow will not stick to it. Two commercial plastics formulations in which this material is available are Phillips 4903 available from Phillips Petroleum Co., Chemical Department, Plastics Division, Bartlesville, Oklahoma 74003 and Chemplex 5704 available from Chemplex Co., Rolling Meadows, Illinois 60008. Any high density polyethylene equivalent to these formulations may be employed. Other plastics materials including polypropylene may be used.

The housing 22 is made by the blow molding procedure which results in a strong, light-weight, double-walled, hollow structure. The blow molding procedure itself may be conventional, is not part of the present invention, and therefore will not be described here in detail. Briefly, however, it involves the extrusion of a tubular parison and its transfer while molten to a mold where it is air blown to conform to the internal shape thereof. For details, reference may be had to "blow molding procedures and equipment" beginning on page 797 of the 1968 Modern Plastics Encyclopedia.

The present invention is concerned with automatically attaching a wear strip 36 to the leading edge portion 34 of the plastic housing during the blow molding procedure.

Although specific dimensions are not critical, in the present case the lip or leading edge portion 34 is about two feet wide. The snow scoop in plan view is about two feet square, approximately a foot high, therefore holding about four cubic feet of snow in one pass.

One specific wear strip which has been successfully employed in the present invention is a cold-rolled steel strip 1½ inches wide, 1/16 inch thick, and about 2 feet long. It has four oval openings 38 in its central portion and an elongated slot 40 extending lengthwise in each of the left and righthand end portions respectively, the slots extending closely adjacent to the ends of the wear strip, and each slot extending a major portion of the length of the corresponding half of the wear strip. As shown in the drawings, each slot 40 occupies approximately 50%, of preferably more, of the corresponding lefthand or righthand half of the wear strip.

The wear strip is pre-positioned in a blow mold (not shown) contoured internally to the shape of the housing 22. It is held by means of a pair of locating pins 42 (FIG. 11) positioned at the inner ends of the slots 40 to hold it precisely in place so one edge will extend slightly forwardly of the plastic housing when the molding is completed. The molten parison is transferred to the mold which will be closed upon it, and air will then be blown to conform the plastic to the inside surface of the mold. The air and mechanical pressure causes ribs 44 of molten plastic material to flow from the leading edge portion 34, through the slots 40, and buttons or plugs 46 of the same material to flow through the oval openings 38. Once extruded through these slots and openings, the plastic will be flattened (against the mold surface not shown) into flanges 48, 48 (FIG. 9) and the heads 50 (FIG. 10).

The wear strip has a pair of upwardly inclined edge portions 52 running alongside each slot 40. These have lower surfaces 54 providing concavities to receive the flanges 48. Likewise, the oval openings 38 are surrounded by upwardly inclined edge portions 56 providing cavities on the underside for the heads 50. As will be explained, one of the important features of the invention is the slidable relation between the top and bottom surfaces 54 and 58 of edge portion 52, and the contacting plastic leading edge portion 34.

At the stage in the blow molding operation when the molten plastic has just been extruded through the slots 40 and the locating pins 42 are still in place, the plastic takes the form shown in FIG. 11, before it cools and shrinks.

The plastic ribs 44 at this stage are extruded through the slots 40 and the plastic surfaces of the flanges 48 and portion 34 are slidably engaged with the wear strip surfaces 54 and 58. Likewise, as shown in FIG. 10, the molten plastic buttons 46 are extruded through oval openings 38 and heads 50 are flattened against the recessed bottom surfaces 60 of the inclined edge portions 56.

A subsequent stage in the blow molding procedure is shown in FIG. 12. After preliminary cooling and setting in the mold, the locating pins 42 will be withdrawn and the entire housing removed from the mold for finishing cooling outside. At this time, due to the relatively rapid shrink rate of the cooling plastic material compared to the steel wear strip, the plastic of the leading edge portion 34 will shrink inwardly, that is toward the center, in the direction of arrow 62 in FIG. 12. Flanges 48, and the counterpart plastic portions 34 above them, slide leftwise against wear strip surfaces 54 and 58, along the slots 40. As seen at the right end in FIG. 12, the rib 44 and flanges 48, 48 have shrunk to the left, pulling away from comparable end surfaces 44a and 48a, 48a at the outside end of the slot in the wear strip. At the left end of FIG. 12, and in FIG. 12a, it will be noted that the inner surface 64 of the rib 44 has likewise shrunk to the left, toward the inner end wall 64a of the slot. The recess 66 left in the plastic material by withdrawing the locating pin 42 provides clearance for the inner end surface 64 of the rib. As shown in FIG. 12a, leftwise shrinkage of the cooling plastic 34 causes the cavity 66 to receive or swallow the portion 68 of the wear strip at the inner end of the slot 40. Thus, the locating pin 42 serves a useful dual purpose, first holding the wear strip in place during the molding operation in the conventional manner, and, second, providing clearance between the inner end 64 of the rib and inner end 64a of the slot to compensate for shrinkage characteristics of the plastic.

The above described arrangement and method are illustrative of a small number of many possible specific embodiments of the invention. Numerous and various other arrangements and methods can readily be devised in accordance with the principles disclosed by those skilled in the art without departing from the spirit and scope of the invention.

The embodiments of the invention in which an exclusive property or privilege is claimed are defined as follows:

1. In a snow removal device, a scoop comprising a housing made of plastic material having a bottom wall, left and right side walls, a back wall, and a lip along a leading edge portion of said bottom wall opposite said back wall;
   said leading edge portion being reinforced on the underside by an elongated, ground-engaging wear strip;
   said wear strip having an elongated slot extending lengthwise thereof in each of the left and right end portions respectively, said slots extending along said leading edge portion of said bottom wall and having outer ends closely adjacent to the left and right ends of the wear strip, said slots having inner ends adjacent one another in the center portion of the wear strip;
   said wear strip being fastened to the underside of said housing by means including ribs of plastic material integral with said leading edge portion of said bottom wall extending through said slots and having widened flanges engaging bottom surfaces of the wear strip alongside the slots enabling limited inward sliding movements of the ribs lengthwise of the wear strip as the plastic material cools and contracts following a molding operation during which said ribs are extruded through said slots; and the inner ends of said ribs being spaced from the inner ends of said slots to provide recesses to receive said inner ends of the slots during said inward sliding movement of the ribs.

2. In a snow removal device, the combination of claim 1 in which the edges of the slots on the bottom side of the wear strip are recessed to provide concavities for the flanges of said ribs.

3. In a snow removal device, the combination of claim 1 in which each of said slots extends a major portion of the length of the corresponding half of the wear strip.

4. In a snow removal device, the combination of claim 1 including fastening means for locking the center portion of said leading edge portion to the center portion of said wear strip independently of said elongated slots and ribs.

5. In a snow removal device, the combination of claim 4 in which said fastening means comprises a plurality of buttons of plastic material extruded from said leading edge portion through openings in said wear strip.

6. In a snow removal device, the combination of claim 5 in which the plastic material is selected from a group in which the elongation at yield along the portion containing said buttons is substantially larger than the mold shrinkage to avoid latent stress overloading of the plastic material adjacent said center portion of the wear strip.

7. A method of attaching a wear strip to the leading edge portion of a plastic snow scoop during blow molding of the plastic housing thereof comprising the steps of:

(a) providing two elongated slots in said wear strip with outer ends of the slots adjacent the opposite ends of the wear strip and inner ends adjacent one another in the center portion of the wear strip;

(b) placing said wear strip in a mold in position to engage said leading portion of said housing when formed therein;

(c) introducing a molten plastic parison within said mold and subjecting the parison to pressure to conform it to the interior of said mold while concurrently applying pressure to the leading edge portion of the plastic housing being so formed to extrude ribs of molten plastic through said slots to provide widened flanges engaging bottom surfaces of the wear strip alongside the slots;

(d) providing recesses between the inner ends of the ribs and the inner ends of the slots while extruding said ribs; and (e) cooling and hardening said plastic housing while permitting said ribs to slide inwardly toward one another within said slots while the inner ends of said ribs are received in said recesses as the plastic material in the leading edge portion shrinks.

8. A method of attaching a wear strip to the leading edge portion of a plastic snow scoop during blow molding, according to claim 7 including the steps of:

(a) placing positioning pins through the inner ends of said slots to provide said recesses between the inner ends of the slots and ribs in the leading edge portion during introduction and extrusion of the plastic material; and (b) removing said postioning pins to expose said recesses and provide clearance between the inner ends of the slots and ribs as said ribs shrink toward the inner ends of the slots as the plastic material in the leading edge portion cools.

* * * * *